May 20, 1969     A. G. LOUGHEAD     3,445,761

MAGNETIC FIELD INTENSITY METER

Filed Sept. 22, 1965

Aaron G. Loughead,
*INVENTOR.*

BY Harry M. Saragovitz
Edward J. Kelly
Herbert Berl
Robert C. Sims

United States Patent Office 3,445,761
Patented May 20, 1969

3,445,761
MAGNETIC FIELD INTENSITY METER
Aaron G. Loughead, Huntsville, Ala., assignor to the United States of America as represented by the Secretary of the Army
Filed Sept. 22, 1965, Ser. No. 489,436
Int. Cl. G01r *33/02;* G01c *19/34*
U.S. Cl. 324—47                 5 Claims

ABSTRACT OF THE DISCLOSURE

A magnetic field intensity meter for measuring sensitive magnetic fields without disturbing even the smallest field to be measured. An electrical coil is enclosed in a non-magnetic cylindrical rotor that is housed in a non-magnetic sleeve and has non-magnetic plates at each end. The ends of the coil are brought out at opposite ends of the rotor and connect to a photocell and detector means. Air jets around the rotor periphery spin the rotor when air is applied during operation of the meter.

---

The invention described herein may be manufactured and used by or for the Government for governmental purposes without the payment of any royalty thereon.

This invention relates generally to a magnetic field meter and more specifically, this invention relates to a sensitive magnetic field meter using the rotating coil principle. The meter is constructed of non-magnetic, non-conductive material so as not to disturb even the smallest magnetic field which is to be measured.

When using magnetic guidance in a missile or aircraft, there is a need for a very sensitive magnetic field meter and the meter itself must be constructed of non-magnetic material so that it will not disturb the field within which it is placed. It is therefore, an object of this invention to provide a very sensitive magnetic field meter.

It is another object of this invention to provide a magnetic field meter which will not disturb even the smallest magnetic fields within which the meter is placed.

Further, an object of this invention is to provide a magnetic field meter which will give the magnitude and direction of the measured field.

Still further, it is an object of this invention to provide a magnetic field meter which is simple to use.

Other objects and many of the attendant advantages of this invention will be readily appreciated as the same becomes better understood by reference to the following detailed description when considered in connection with the accompanying drawing in which like reference numerals designate like parts throughout the figures thereof and wherein.

In order to better understand the operation of the device described in the figures, a description of its components referred to is first presented.

Figure 3:
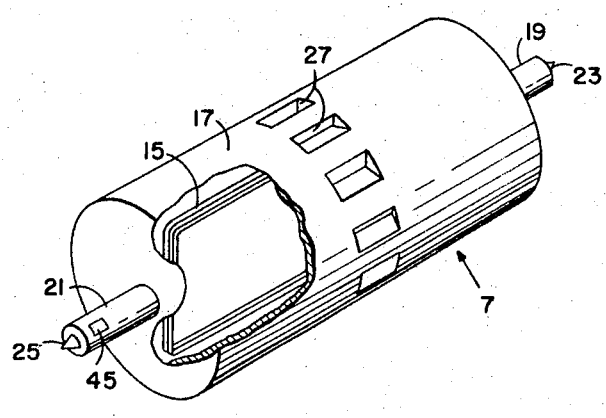
FIGURE 3 is a perspective view of the inner rotor shown in FIGURE 1 partially cut away.

Referring now to the drawings, the numeral 5 (FIGURE 1) designates a magnetic field meter. Meter 5 is provided with a rotor 7; a non-magnetic, non-conductive cylindrical sleeve 9; and a pair of non-magnetic, non-conductive annular plates 11 and 13 affixed to each end of sleeve 9. Rotor 7 shown generally in FIGURE 3 is provided with an electrical coil 15 which is encapsulated in a cylindrical container 17 made of a non-magnetic, non-conductive material. The ends of the coil 15 are taken out at each end of the rotor 7 through the shafts 19 and 21 to contacts 23 and 25 respectively. The cylinder 17 has a plurality of depressions 27 (FIGURE 2) around the periphery. The depressions are so formed that when air is made to pass over the surface tangentially thereto it will impart rotation to the rotor 7, thereby rotating all components of rotor 7 as a fixed unit.

The sleeve 9 has a plurality of air jets 29 (FIGURE 2) which force air tangentially against rotor 7 in the vicinity of depressions 27. The jets 29 spin the rotor 7 and provide a gas lubricated spin bearing. Air escapes the device between the inner opening of annular plates 11 and 13 and rotor shafts 19 and 21 respectively providing axial support by the air bearing principle.

Electrical continuity between the contacts 23 and 25 and the detector means 31 is provided by fixed contact arms 33 and 35 mounted on the annular plates 11 and 13 by means of insulators 37 and 39 respectively. When the rotor 7 is spinning in a magnetic field, an alternating voltage is developed in coil 15 as it rotates in the field. This voltage is passed through contact arms 33 and 35 to a detector means 31 where it may be recorded or visually displayed or both. Detector means 31 may be a conventional type of indicator commonly used with periodic type signals and must be capable of accurately detecting input signals at the maximum speed the rotor 7 is to be revolved.

Figures 1, 2:
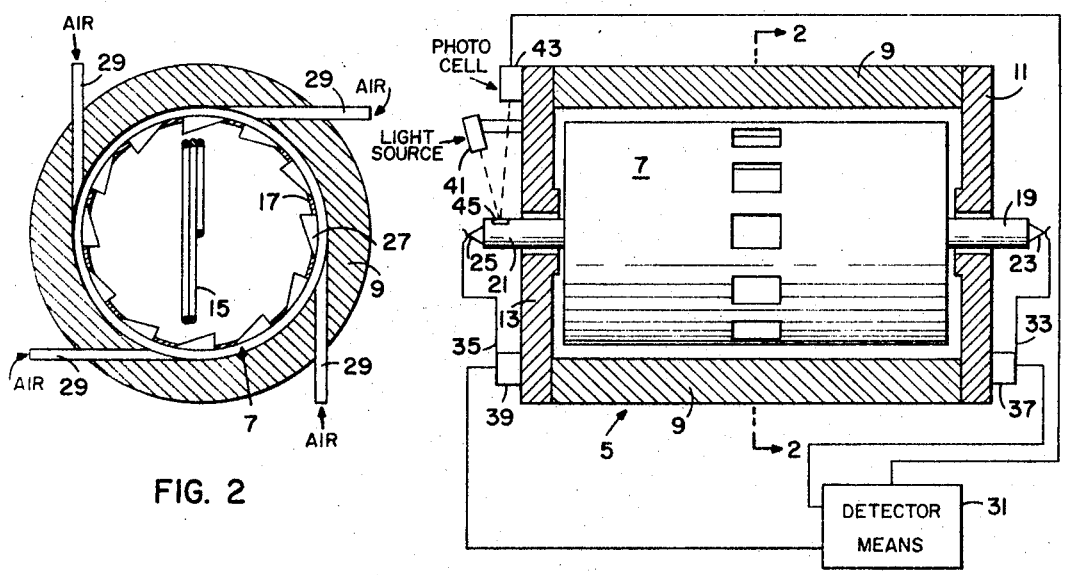
FIGURE 1 is a partial sectional view of a magnetic field meter according to the present invention.
FIGURE 2 is a sectional view taken along lines 2—2 of FIGURE 1.

As may be seen in FIGURE 1, a light reflective plate 45 is attached to shaft 21 for reflecting a beam of light from a light source 41 to a photocell 43. Reflective plate 45 will rotate with shaft 21, remaining in the same relative position to coil 15 and all other component parts of rotor 7. During rotation of rotor 7, a beam of light is intermittently reflected from light source 41 by way of plate 45 to photocell 43. This light beam is reflected once during each revolution of rotor 7. As shown in FIGURE 3, when reflective plate 45 is in a given position, coil 15 is in a given position. Thus, when photocell 43 is triggered by the reflected light beam, coil 15 and rotor 7 are in the same relative position as all previous triggerings of photocell 43. A voltage output of photocell 43 is connected to a high impedance input of a detector means 31, which gives an indication each time the light is reflected to photocell 43 and thereby indicates the relative position of rotor 7 and coil 15 within and with respect to sleeve 9. The high impedance input to detector means 31 is to insure a low voltage being applied to the detector to prevent coupling of any induced voltage from detector 31 back to coil 15, thereby preventing disturbance of the magnetic field being measured.

OPERATION

When the meter 5 is operating in a magnetic field, air is being forced in through the air jets 29 and the rotor 7 is rotating; a voltage will appear across the ends of coil 15. This voltage (V) is defined as follows:

V (instantaneous) = $-(\cos \theta) \times B \times N \times \omega \times A \times (\sin \omega t) \times 10^{-8}$ volts where:

$\theta$ = The angle between the field lines and rotational axis of the rotor.
B = Field intensity (Gausses)
$\omega$ = Angular velocity of the rotor
A = Effective area of the coil
N = Number of turns of the coil The effective coil area (A) is the area enclosed by the coil 15 and is provided by the manufacturer or if the coil is made by an individual the area may be readily calculated. The peak voltage output of the coil, passed through contact arms 33 and 35, is indicated by detector means 31, and is the maximum deviation from a zero reference line about which the signal varies. The output of photocell 43 is indicative of each revolution of rotor 7 and the total number of photocell outputs received by detector 31 in a given time indicates the frequency of the output actuating current from coil 15.

With respect to meter 5, the magnitude of the magnetic field component, as indicated by detector means 31, is represented by the peak voltage received from coil contacts 25 and 23. The direction of the magnetic field with respect to the rotational axis of the rotor is determined by comparing the time location of the photocell output voltage pulse and the associated time location of the coil 15 output voltage with the zero reference point or line. If detector means 31 includes a recording oscillograph or an oscilloscope, for example, these values would be readily obtainable.

Since the device is completely non-magnetic, it will measure, but not disturb, the smallest magnetic field. The meter can be used to determine direction and measure the magnitude of any constant magnetic field or may be used as a compass with suitable nulling circuitry, magnetic survey mapping, submarine detection, in degaussing ships and submarines etc.

While the invention has been described with reference to a preferred embodiment thereof, it will be apparent that various modifications and other embodiments thereof will occur to those skilled in the art within the scope of the invention. Accordingly, it is desired that the scope of this invention be limited only by the appended claims.

What is claimed is:
1. A magnetic field meter comprising: an electric coil; said coil being encapsulated in a non-magnetic, non-conductive cylinder and lying in a plane defined by a mid-longitudinal cross section of said cylinder, said coil having output leads extending out opposite ends of said cylinder; a hollow cylindrical non-magnetic, non-conductive sleeve for receiving said cylinder; said cylinder being held in place inside said sleeve by a pair of annular non-magnetic, non-conductive plates affixed to each end of said sleeve; support shafts rotatably mounting said cylinder with respect to said sleeve in said annular plates; contact means connecting said leads of said coil to a detection means; air jet rotating means for rotating said cylinder and coil within said sleeve relative to the magnetic field, thereby generating a periodic signal on said leads whose magnitude and phase is a function of the strength and direction of the field; photocell indicating means providing a pulse signal indicative of the relative position of said coil with respect to said sleeve, said photocell indicating means being connected to said detection means, said detection means receiving and correlating said signals to provide output indications of field strength and direction.

2. A magnetic field meter as set forth in claim 1 wherein said electric coil means comprises: an electric coil having a predetermined number of turns; said coil being positioned inside said cylinder.

3. A magnetic field meter as set forth in claim 1 wherein said air jet rotating means comprises: a plurality of air passages positioned around said sleeve; said air passages being disposed at such an angle to allow jets of air to be blown tangentially against the outer periphery of said cylinder; said cylinder having a plurality of depressions located around the periphery thereof; and, said depression being aligned in such a manner so as to impart motion to said cylinder when air is forced through said passages.

4. A magnetic field meter as set forth in claim 2 wherein said photocell indicating means comprises: a light source; a photocell receiver means; and a reflector means positioned in a fixed relationship relative to said coil on a shaft of said cylinder whereby a synchronizing pulse is obtained at the output of said receiver means for the purpose of indicating the orientation of a measured field with respect to said meter.

5. A magnetic field meter as in claim 4 wherein said air entering said sleeve is allowed to escape between the surfaces of the inner aperture of said annular plates and said shaft of said cylinder thereby forming an air lubricated spin bearing to aid in the rotation of said cylinder.

References Cited

UNITED STATES PATENTS

| | | | |
|---|---|---|---|
| 2,176,197 | 10/1939 | Bentley | 33—204 |
| 2,983,865 | 5/1961 | Wenner | 324—43 |
| 3,291,995 | 12/1966 | Schalkowsky | 250—230 X |
| 2,436,039 | 2/1948 | Fay | 324—47 |
| 2,615,961 | 10/1952 | Means | 324—43 |

FOREIGN PATENTS 110,226  2/1944  Sweden.

OTHER REFERENCES

Journal of Scientific Instruments, vol. 36, November 1959, "TIM; a brushless generating magnetometer," by C. W. McCutchen, pp. 471–474.

RUDOLPH V. ROLINEC, *Primary Examiner.*

R. J. CORCORAN, *Assistant Examiner.*

U.S. Cl. X.R.

33—204